United States Patent
Miloslavsky

(10) Patent No.: US 6,185,291 B1
(45) Date of Patent: *Feb. 6, 2001

(54) PERSONAL DESKTOP ROUTER

(75) Inventor: Alec Miloslavsky, San Carlos, CA (US)

(73) Assignee: Genesys Telecommunication Laboratories, Inc., San Francisco, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/797,420

(22) Filed: Feb. 10, 1997

(51) Int. Cl.[7] .................................................. H04M 3/00
(52) U.S. Cl. ..................... 379/242; 379/219; 379/220; 379/221; 379/265; 379/266; 379/309
(58) Field of Search .................................. 379/93.17, 201, 379/207, 219, 220, 221, 229, 230, 242, 115, 127, 196, 266, 267, 309; 395/611

(56) References Cited

U.S. PATENT DOCUMENTS

| | | | |
|---|---|---|---|
| 4,290,141 | 9/1981 | Anderson et al. | 455/2 |
| 4,320,256 | 3/1982 | Freeman | 179/6.04 |
| 4,345,315 | 8/1982 | Cadotte | 364/900 |
| 4,355,207 | 10/1982 | Curtin | 179/18 |
| 4,355,372 | 10/1982 | Tarshis et al. | 364/900 |
| 4,439,636 | 3/1984 | Newkirk et al. | 179/7.1 |
| 4,451,700 | 5/1984 | Elder et al. | 179/2 |
| 4,489,438 | 12/1984 | Hughes | 381/51 |
| 4,517,410 | 5/1985 | Carley et al. | 179/6.04 |
| 4,521,643 | 6/1985 | Dupuis et al. | 179/2 |
| 4,523,055 | 6/1985 | Hohl et al. | 179/2 |
| 4,528,643 | 7/1985 | Freeny, Jr. | 364/900 |

(List continued on next page.)

OTHER PUBLICATIONS

Call Centers Go Online—Communications Week.

Primary Examiner—Krista Zele
Assistant Examiner—Bing Bui
(74) Attorney, Agent, or Firm—Donald R Boys; Central Coast Patent Agency

(57) ABSTRACT

A personal telephone all router adapted to execute on a personal computer (PC) connected to a local area network (LAN) wherein the LAN is also connected to a computerized telephony switching system has a user interface allowing an individual user to customize routing rules for incoming calls. The interface in a preferred embodiment is a window displayable on a computer screen of the PC, allowing the user to review and edit personal routing rules in a high-level language. Data, such as caller ID and the like, associated with incoming calls received at the computerized telephony switching system is broadcast on the LAN prior to routing the incoming calls, and the broadcast data is utilized by individual editions of the personal telephone call router to prepare and send routing instructions on the LAN to the computerized switching system to route the incoming calls.

13 Claims, 3 Drawing Sheets

U.S. PATENT DOCUMENTS

| | | | |
|---|---|---|---|
| 4,539,435 | 9/1985 | Eckmann | 179/2 |
| 4,559,415 | 12/1985 | Bernard et al. | 179/2 |
| 4,566,030 | 1/1986 | Nickerson et al. | 358/84 |
| 4,577,062 | 3/1986 | Hilleary et al. | 179/2 |
| 4,577,067 | 3/1986 | Paul et al. | 179/99 |
| 4,578,700 | 3/1986 | Shrier et al. | 358/84 |
| 4,580,012 | 4/1986 | Matthews et al. | 179/18 |
| 4,584,602 | 4/1986 | Nakagawa | 358/84 |
| 4,587,379 | 5/1986 | Masuda | 179/2 |
| 4,598,367 | 7/1986 | Defrancesco | 364/408 |
| 4,603,232 | 7/1986 | Shababb | 179/2 |
| 4,611,094 | 9/1986 | Asmuth et al. | 179/7.1 |
| 4,625,276 | 11/1986 | Benton et al. | 364/408 |
| 4,630,200 | 12/1986 | Tateisi et al. | 364/405 |
| 4,630,201 | 12/1986 | White | 364/408 |
| 4,634,809 | 1/1987 | Trok et al. | 379/91 |
| 4,649,563 | 3/1987 | Riskin | 379/97 |
| 4,654,482 | 3/1987 | Deangelis | 379/95 |
| 4,667,287 | 5/1987 | Allen et al. | 364/200 |
| 4,674,044 | 6/1987 | Kalmus et al. | 364/408 |
| 4,696,029 | 9/1987 | Cohen | 379/92 |
| 4,697,282 | 9/1987 | Winter et al. | 379/67 |
| 4,756,020 | 7/1988 | Fodale | 379/112 |
| 4,757,267 | 7/1988 | Riskin | 379/113 |
| 4,763,191 | 8/1988 | Gordon et al. | 358/86 |
| 4,785,408 | 11/1988 | Britton et al. | 364/513.5 |
| 4,788,715 | 11/1988 | Lee | 379/84 |
| 4,812,843 | 3/1989 | Champion et al. | 340/905 |
| 4,866,756 | 9/1989 | Crane et al. | 379/88 |
| 4,893,328 | 1/1990 | Peacock | 379/67 |
| 4,896,345 | 1/1990 | Thorne | 379/67 |
| 4,908,850 | 3/1990 | Masson et al. | 379/88 |
| 4,953,204 | 8/1990 | Cuscheg, Jr. et al. | 379/266 |
| 4,972,461 | 11/1990 | Brown et al. | 379/67 |
| 5,001,710 | 3/1991 | Gawrys et al. | 370/110.1 |
| 5,017,917 | 5/1991 | Fisher et al. | 340/825.79 |
| 5,036,535 | 7/1991 | Gechter et al. | 379/210 |
| 5,164,983 | 11/1992 | Brown et al. | 379/265 |
| 5,256,863 | 10/1993 | Ferguson et al. | 235/383 |
| 5,261,096 | 11/1993 | Howarth | 395/650 |
| 5,278,977 | 1/1994 | Spencer et al. | 395/575 |
| 5,280,625 | 1/1994 | Howarter et al. | 395/200 |
| 5,343,477 | 8/1994 | Yamada | 371/8.2 |
| 5,392,400 | 2/1995 | Berkowitz et al. | 395/200 |
| 5,444,774 | 8/1995 | Friedes | 379/266 |
| 5,455,903 | 10/1995 | Jolissaint et al. | 395/155 |
| 5,528,678 | 6/1996 | Kaplan | 379/201 |
| 5,530,744 | 6/1996 | Charalambous et al. | 379/265 |
| 5,583,922 * | 12/1996 | Davis et al. | 379/207 |
| 5,630,127 * | 5/1997 | Moore et al. | 707/104 |
| 5,768,360 * | 6/1998 | Reynolds et al. | 379/220 |
| 5,974,414 * | 10/1999 | Stanczak et al. | 707/6 |

* cited by examiner

Sample of broadcast announcement record

Sample User Interface Screen

PERSONAL DESKTOP ROUTER

FIELD OF THE INVENTION

The present invention is in the area of telephone call processing and switching, and pertains more particularly to intelligent call-routing systems, and equipment and methods for customizing and Personalizing Routing Rules and Protocol.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventor and to those with skill in the art in general.. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994. This document is incorporated herein by reference.

At the time of filing the present patent application there continues to be remarkable growth in telephone routing systems, with routing done both at or near point-of origin of incoming calls, and at call destinations. For example, systems are known to the present inventor that perform initial call processing before routing an incoming call to a destination switch, and further routing is done at the call destination in computerized telephony equipment, often termed customer premises equipment (CPE). The present invention pertains most particularly to routing at customer premises.

There are, at the time of the present patent application a considerable range of CPE systems available for use from various manufacturers, and, as state-of-the-art routing systems are typically computerized, there is a broad variety of software available for such systems as well. It is the software in general wherein routing rules are set, and the routing rules determine the decision-making paths a system follows in routing calls.

In current art, although there are widely varying systems in the art relative to routing rules, all such systems exhibit a common drawback. Typically such systems, once set up (programmed) to follow certain routing rules and practices, cannot easily vary, and individual users or groups of users, cannot change the rules arbitrarily. To tinker with the routing rules in CPE typically requires a highly-trained maintenance technician (system administrator).

What is clearly needed is method and apparatus which allows an individual user of a routing system, or a group of users, to alter and customize the routing rules of the system for particular purposes, which may change from time to time, depending on the users.

SUMMARY OF THE INVENTION

In a preferred embodiment of the present invention a method for routing telephone calls at customer premises is provided, comprising steps of (a) receiving a call at a telephony switch coupled to a customer local area network (LAN); (b) broadcasting identifying data associated with the call on the LAN; (c) intercepting the broadcast data at a personal router application executing on a computer connected to the LAN; (d) determining routing for the instant call in the personal router application; and (e) sending personal routing instructions to the telephony switch as a result of the personal routing determined in step (d).

The method in a preferred embodiment may execute the personal router on a personal computer (PC) connected to the LAN. The personal router, also in a preferred embodiment, includes a user interface providing capability for a user to edit routing rules, and including a step for editing routing rules. The user interface comprises an-on screen window providing editable script in a high-level language.

In another aspect, in a customer premises telephone call-routing system, a method for individual customization of routing rules for an incoming telephone call is provided, comprising steps of (a) calling a user interface on a computer connected to a customer LAN, the LAN also coupled to a computerized telephony switch system receiving the incoming telephone call, wherein the telephony switch system is adapted to broadcast data associated with incoming call on the LAN prior to routing the incoming call; (b) editing routing rules at the user interface; (c) associating the edited routing rules with the broadcast data; and (d) instructing the computerized telephony switch system to route the incoming call according a specific routing determined by the edited routing rules. In this method the computerized telephony switch system may comprise a telephony switch connected to a telephony server in turn connected to the LAN.

In another aspect, a personal telephone call router for determining routing of incoming telephone calls in a customer premises telephone call switching system is provided, comprising a user interface displayable on a display screen of a computer workstation and adapted to display personal routing rules and provide editing functions for a user to edit the personal routing rules with one or more input devices of the computer workstation; an interceptor adapted for intercepting telephone call data broadcast on a LAN to which the computer workstation is connected; and an instruction transmitter adapted for transmitting routing instructions on the LAN to which the computer workstation is connected, the routing instructions determined by interaction of the broadcast telephone call data with the instant routing rules at the computer workstation. The computer workstation may be a personal computer (PC) having a LAN interface, and the user interface is in preferred embodiments adapted to operate with a high-level programming language.

In yet another aspect of the instant invention a customer premises telephone call routing system is provided comprising a computerized telephony switch system having one or more incoming telephone lines; a customer local area network (LAN) coupled to the computerized telephony switch system; a computer workstation including a display connected to the LAN; and a personal telephone call router executable on the computer workstation. The personal telephone call router is adapted to receive telephone call data broadcast on the LAN associated with a selected telephone call, and to return routing instructions current in the personal telephone call router to the LAN for the selected telephone call.

In this alternative embodiment router comprises a user interface displayable on the display and adapted to display personal routing rules and provide editing functions for a user to edit the personal routing rules with one or more input devices of the computer workstation, which may be a PC having a LAN interface. In this as in other embodiments the user interface is adapted to operate with a high-level programming language. The computerized telephony switch system comprises a telephony switch connected to a telephony server in turn connected to the LAN.

In these and other embodiments of the instant invention the serious impediments of conventional systems, wherein routing rules are codified in a central system in perhaps esoteric low-level language, requiring a highly trained system administrator to make any changes, and wherein the changes that may be made in any case are seriously limited, are overcome. Now, with embodiments of the invention, individual users may provided individual customized routing rules for incoming calls, significantly increasing workplace efficiency and capability.

BRIEF DESCRIPTION OF THE DRAWING FIGURES

DESCRIPTION OF THE PREFERRED EMBODIMENTS

Figure 1:
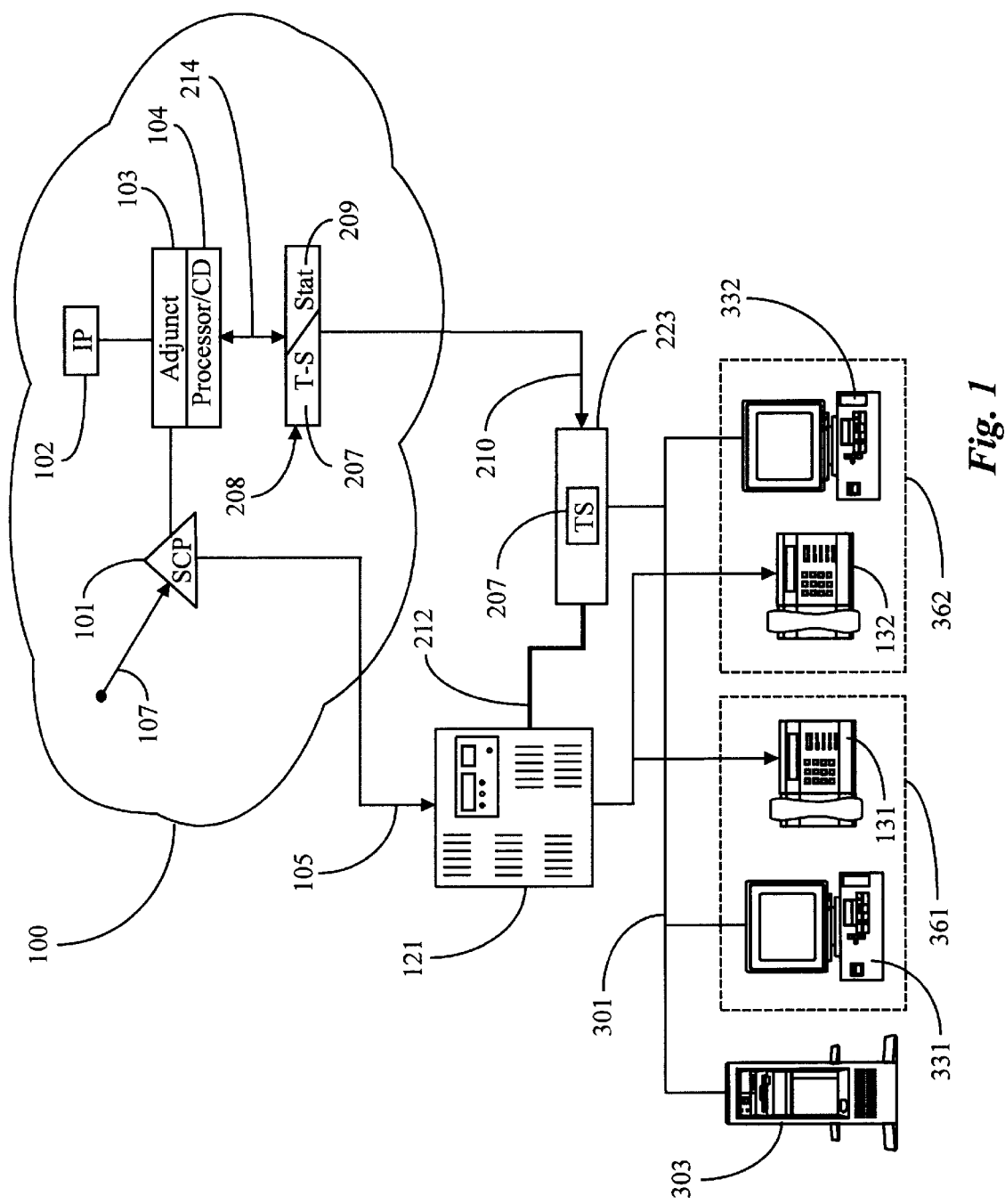
FIG. 1 is a system diagram of a call-routing system in an embodiment of the present invention.

FIG. 1 is a system diagram of a call-routing system according to a preferred embodiment of the present invention. Dotted lines 123 enclose elements of the system native to a customer's premises (CPE). This equipment in a preferred embodiment comprises a computerized telephony switch 121 connected by a data link 212 to a telephony server (T-S) 223. Link 212 is preferably a CTI link, although other data links might be used. Switch 121 distributes incoming calls on line 105 to connected telephones, such as telephone 131 at a workstation 361 and telephone 132 at a second workstation 362.

Each workstation has a PC with display, such as PC/VDU 331 at workstation 361 and PC/VDU 332 at workstation 362. There will be in most architectures many more than the two telephones with workstations shown, but two are considered adequate by the inventors to illustrate the present invention.

PC/VDUs 331 and 332 are connected on a local area network (LAN) 301 which also connects to a data file server 303 and to T-S 223. The arrangement of PC/VDU plus telephone at each workstation is a common arrangement for most company facilities, and has become more common as more and more people become computer literate. Moreover, many companies are actively training employees in use of computers.

In the system shown, calls may originate at any remote call-in point, which is represented in FIG. 1 by region 100, referred to herein as the network cloud. Network cloud 100 may be a small regional portion of the world-wide network of connected telephony equipment, or may represent the entire world-wide network. An incoming call is represented by vector 107 to service control point (SCP) 101 (typically a telephony switch), which is connected to an adjunct processor 103 and coupled thereby to an intelligent peripheral (I-P) 102, a distribution processor 104 and a statistical processor 218. In this system calls are forwarded to switch121 over telephone line 105, and associated data is forwarded in parallel to T-S 223 over a digital network link 210. Such systems, wherein data associated with a call is forwarded on a separate link from the call itself, are, to the inventor's knowledge at the time of the present patent application, not known in the art, but are known to the inventor. This feature, however, is not required in practice of the present invention, but preferred in some embodiments.

In typical cases a call originating in the network cloud and routed to switch 121, destined for one of telephones 131 or 132 or to another destination at the customer's premises, carries a telephone number, which may include a direct inward dialing (DID) feature, whereby a limited number of lines may be used to carry calls to a larger number of final destinations, accomplished principally by software techniques. The phone call may also have caller ID attached (originating caller's phone number), and in some cases a data packet associated with the call may be forwarded over link 210 to T-S 223. Finally, T-S 223, which is connected to and interacts continuously with switch 121 in this embodiment, is capable of transacting with data file server 303, given caller ID and/or elicited information from the caller, to retrieve further information about the caller from data file server 303.

It will be apparent to those with skill in the art that incoming calls are not limited to two telephones as shown in FIG. 1. There may be many more than two telephones connected to switch 121, other telephony equipment, such as facsimile equipment and data lines may also be connected and involved in routing decisions and transactions according to embodiments of the present invention. Moreover, existing techniques, such as virtual expansion for routing calls with a certain number to multiple destinations on some preprogrammed protocol may also be involved. The simple diagram of a switch with two telephones connected is meant to be illustrative for description of the present invention.

It will be apparent to those with skill in the art as well, that a separate telephony server shown as T-S 223 in FIG. 1, is not strictly required in embodiments of the invention, depending on the level of machine intelligence and sophistication of switch 121. Switches for customer premises continue to be developed with new levels of intelligent capability, and some may be capable of interacting with other elements of the present invention without a separate T-S between the switch and a LAN such as LAN 301. T-S 223 will be required to practice the invention with many existing telephony switches which may be used as element 121.

In a preferred embodiment of the present invention routing intelligence is no longer confined to a central location such as telephony switch 121, but distributed in a manner that individual users of the system may customize routing at their own workstations. This is accomplished in large part by control code executable at a user's computer workstation. It is not required that the actual code be always at the user's workstation, as it may be shared code resident at, for example a file server on LAN 301, such as file server 303. The unique code may be accessed from such a server and executed at any one of several workstations such as workstations 361 and 362 by PC/VDU 331 and PC/VDU 332 respectively.

Figure 2:
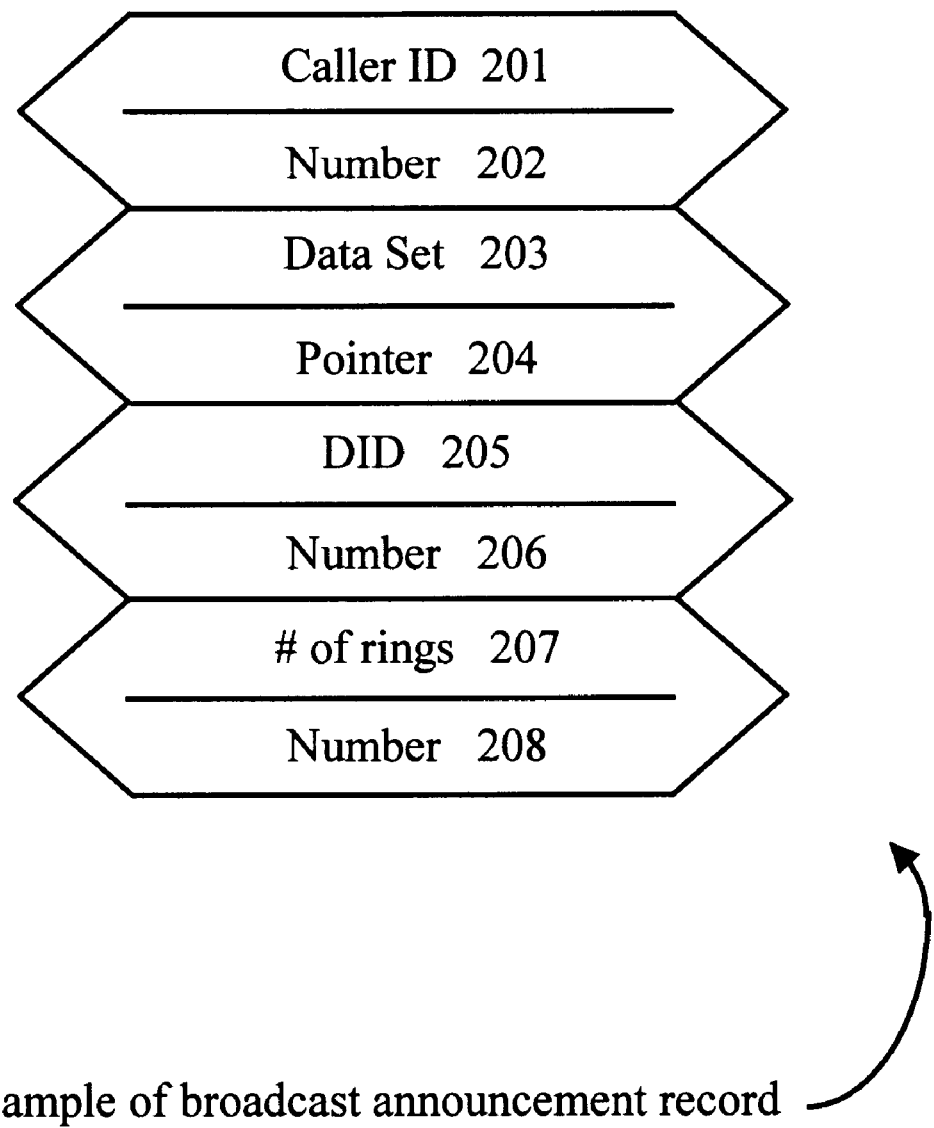
FIG. 2 is a sample of a broadcast announcement record in an embodiment of the present invention..

In a preferred embodiment of the invention, a company-level routing application is executed at T-S 223. Referring now to FIG. 2, with each incoming call, an overall record of the call, prior to routing, is broadcast on LAN 301. This overall record can take a number of different forms, of which the example in FIG. 2 is one. In this example the overall record consists of four data portions. One data portion consists of elements 201 and 202. Data element 201 identifies this portion as the caller ID associated with the incoming call, and element 202 is the caller ID number. A second data portion consists of data elements 203 and 204. This portion is a data set which may be transmitted via link 210 to T-S 223 in parallel with the incoming call, or may be retrieved from server 303, using other call data as a pointer. Element 203 identifies the data as a data set, and element 204 is the pointer. Similarly elements 205 and 206 constitute DID number, and elements 207 and 208 fix number of rings.

At the computer portion of an individual workstation, such as PC/VDU 331 at workstation 361, a user has access to control code which is interactive with code executed at T-S 223, to control and customize routing for incoming calls, depending on certain data elements in the broadcast announcement record (FIG. 2). As a part of this unique capability, the individual user may load to his/her VDU a unique user interface, an example of which is shown in FIG. 3.

Figure 3:
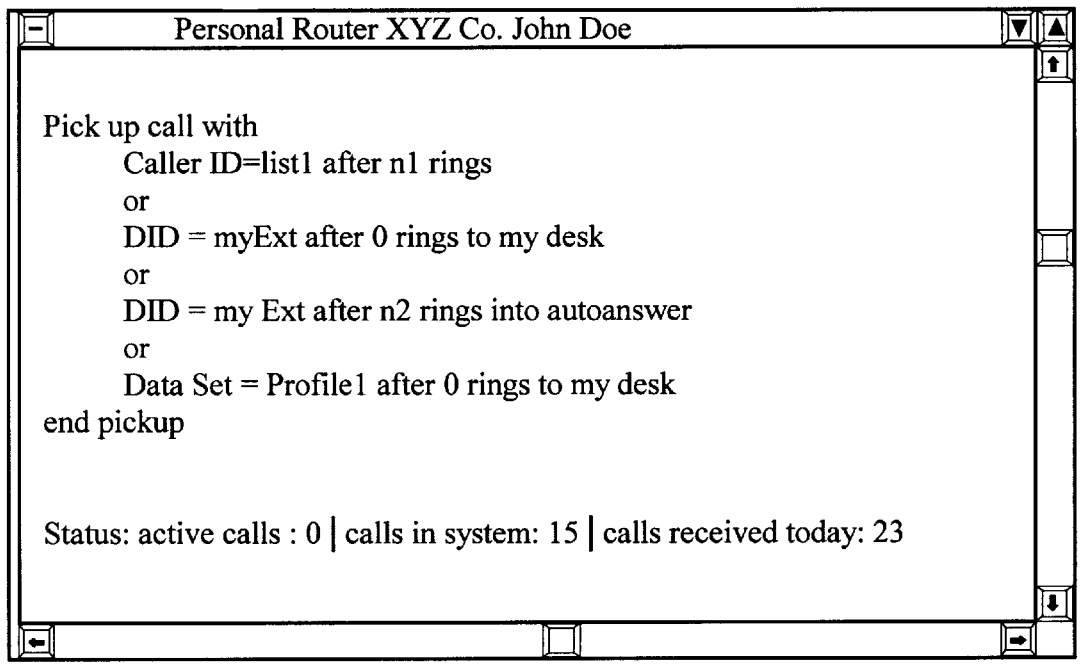
FIG. 3 is a sample user interface screen in an embodiment of the present invention.

FIG. 3 illustrates a window presentable to a user at an individual workstation, compatible, for example, with windows operating systems. This is an input and display interface for a personal router, a variation of which may be assigned to each of selected employees to provide these individuals with an ability in conjunction with the premises telephone equipment to customize and periodically adjust the routing of certain incoming calls. In this example, the interface is for company XYZ and limited to employee John Doe.

Through the individual interface, John Doe in this instance, may program in a relatively high-level language, routing preferences for certain incoming calls, according to data broadcast for such calls on LAN 301. John Doe has programmed his interface, for example, to pick up all calls having Caller ID matched with a list "list1" after n1 rings. List1 is resident in John Doe's database associated with the Personal Router, and John Doe may call up this list and amend, delete, and expand it as he wishes. The number of rings n1 may be any convenient number to accomplish John's purpose.

John Doe may program negative lists as well. Although not recommended, a negative list could be used to hang up on all calls that have an ID associated with a company or individual that has been making harassing calls to an employee, or to shunt such calls to a special tracking program or the like.

John Doe in this instance has also programmed his personal router to send all calls bearing his assigned DID number to the telephone at his desk after 0 rings, and to an answering machine after n2 rings. Associations with data sets may also be made, comparing such data sets to stored profiles and the like. At the bottom of the display in this example a status summary of calls may be provided. A user may choose to have this window resident on his computer screen as a pix-on-pix, or to hide it and call it as needed. Also, it will be apparent to those with skill in the art that it is not strictly required that each selected person having an associated routing interface assigned have a computer at his/her elbow. For those persons not, for one reason or another, inclined to program their own routing, the interface may be called up and done by another, with appropriate access security applied. A secretary or system administrator may perform such functions, using any workstation connected to company LAN 301.

In a preferred embodiment of the invention, calls received at switch 121 (FIG. 1) are broadcast on LAN 301. This can be all calls, or just selected calls. For a call broadcast on the LAN, the system waits for a pre-programmed time for return from an individual PC workstation of routing instructions. If the workstation assigned to a user for whom the call is broadly meant is active, the Personal Router at that station interacts with the broadcast and returns instructions to, in this case, T-S 223, which then instructs switch 121 in routing the call.

In embodiments of the invention, not necessarily all calls are routed by personal routers executed on PCs on LAN 301. There may also be over-riding routing rules programmed into switch 121, such that certain calls or types of calls are always handled in a certain way. Rules in switch 121 may also determine the fate of calls that are not eventually routed by personal routers. For example, all calls alive after seven rings may be switched to a recorded announcement, and the like. In this manner a very broad freedom of routing may be accomplished, with security and flexibility to adapt for changes in the organization.

It will be apparent to those with skill in the art that the division of code and functionality between server 303, T-S 223, and individual workstations on the LAN is somewhat arbitrary, with the requirement that individuals at the workstations have interface access to customize and update personal routing rules.

It will be apparent to those with skill in the art that there are many alterations that may be made in the embodiments of the invention herein described without departing from the spirit and scope of the invention. Some of these have been described above, such as the use of a telephony server like T-S 223. In some cases such a server is not needed to practice the invention.

Many of the functional units of the system in embodiments of the invention may be implemented as code routines in more-or-less conventional computerized telephony equipment, computer servers, and individual workstations. It is well-known that programmers are highly individualistic, and may implement similar functionality by considerably different routines. Also, the invention may be applied to widely varying hardware systems. Further, hardware used to practice the invention may vary in many ways. There are similarly many other alterations in the embodiments described herein which will fall within the spirit and scope of the present invention in it's several aspects described. The invention is limited only by the breadth of the claims below.

What is claimed is:

1. A method for routing telephone calls to a plurality of individual agent workstations at a customer premises, comprising steps of:
    (a) receiving a call at a telephony switch coupled to a customer local area network (LAN);
    (b) broadcasting identifying data associated with the call on the LAN;
    (c) intercepting the broadcast data at a personal router application having a separated set of specified editable personal routing rules and executing on a computer at one of the plurality of individual agent workstations, the routing application determining routing rules specifically for that workstation connected to the LAN;
    (d) editing the routing rules with an user interface;
    (e) determining routing for the instant call in the personal router application; and
    (f) sending personal routing instructions to the telephony switch as a result of the personal routing determined in step (e).

2. The method of claim 1 wherein the computer executing the personal router application in step (d) is a personal computer (PC) connected to the LAN.

3. The method of claim 1 wherein the user interface comprises an-on screen window providing editable script in a high-level language.

4. In a customer premises telephone call-routing system, a method for individual customization of routing rules for an incoming telephone call, comprising steps of:
   (a) calling a user interface on a computer at an individual agent workstation connected to a customer LAN, the LAN also coupled to a computerized telephony switch system receiving the incoming telephone call, wherein the telephony switch system is adapted to broadcast data associated with incoming call on the LAN prior to routing the incoming call;
   (b) editing routing rules at the user interface specifically for said individual agent workstation;
   (c) associating the edited routing rules with the broadcast data; and
   (d) instructing the computerized telephony switch system to route the incoming call according a specific routing determined by the edited routing rules.

5. The method of claim 4 wherein the computerized telephony switch system comprises a telephony switch connected to a telephony server in turn connected to the LAN.

6. A personal telephone call router for determining routing of incoming telephone calls to individual agent workstations in a customer premises telephone call switching system, comprising:
   a user interface displayable on a display screen of a computer at one of the individual agent workstations displaying the editable personal routing rules specifically stored for that particular workstation and enabling an agent to edit the personal routing rules specifically stored for the particular workstation for that workstation with one or more input devices of the computer;
   an interceptor intercepting telephone call data broadcast on a LAN to which the computer is connected; and
   an instruction transmitter transmitting routing instructions based on the edited routing rules on the LAN to which the computer is connected, the routing instructions determined by interaction of the broadcast telephone call data with the instant edited routing rules at the computer.

7. The personal telephone call router of claim 6 wherein the computer is a personal computer (PC) having a LAN interface.

8. The personal telephone call router of claim 6 wherein the user interface is adapted to operate with a high-level programming language.

9. A customer premises telephone call routing system for routing calls to telephones at individual agent workstations comprising:
   a computerized telephony switch system having one or more incoming telephone lines;
   a customer local area network (LAN) coupled to the computerized telephony switch system;
   a computer at an individual agent workstation including a display connected to the LAN;
   and a personal telephone call router having a set of editable personal routing rules specifically stored for that particular individual agent workstation executable on the computer at the individual agent workstation to allow an individual agent to edit the routing rules for that particular workstation;
   wherein the personal telephone call router is adapted to receive telephone call data broadcast on the LAN associated with a selected telephone call, and to return routing instructions for that specific individual agent workstation current in the personal telephone call router to the LAN for the selected telephone call.

10. The customer premises telephone call routing system of claim 9 wherein the personal telephone call router comprises a user interface displayable on the display and adapted to display personal routing rules and provide editing functions for a user to edit the personal routing rules with one or more input devices of the computer workstation.

11. The customer premises telephone call routing system of claim 10 wherein the user interface is adapted to operate with a high-level programming language.

12. The customer premises telephone call routing system of claim 9 wherein the computer is a personal computer (PC) having a LAN interface.

13. The customer premises telephone call routing system of claim 9 wherein the computerized telephony switch system comprises a telephony switch connected to a telephony server in turn connected to the LAN.

* * * * *